P. KEMPTER.
COVER HANDLE FOR COOKING UTENSILS.
APPLICATION FILED MAR. 13, 1909.

980,872.

Patented Jan. 3, 1911.

Witnesses:
Fred Palm
Chas. L. Goss.

Inventor:
Philip Kempter,
By Wixler Henden Bottum &c
Attorneys.

UNITED STATES PATENT OFFICE.

PHILIP KEMPTER, OF MILWAUKEE, WISCONSIN, ASSIGNOR TO GEUDER, PAESCHKE & FREY CO., OF MILWAUKEE, WISCONSIN, A CORPORATION OF WISCONSIN.

COVER-HANDLE FOR COOKING UTENSILS.

980,872.     Specification of Letters Patent.     Patented Jan. 3, 1911.

Application filed March 13, 1909. Serial No. 483,125.

*To all whom it may concern:*

Be it known that I, PHILIP KEMPTER, a citizen of the United States, residing at Milwaukee, in the county of Milwaukee and State of Wisconsin, have invented certain new and useful Improvements in Cover-Handles for Cooking Utensils and the Like, of which the following is a specification, reference being had to the accompanying drawing, forming a part thereof.

The main object of this invention is to provide covers for cooking utensils and the like, with handles which when free will automatically assume an upright or standing position, in which they will keep cool so that they may be grasped without burning the fingers, and will turn down and lie flat against the covers out of the way when the covers are nested or are placed one upon another or in an inverted position upon a shelf or table.

It consists in the construction, arrangement and combination of parts as hereinafter particularly described and defined in the claims.

In the accompanying drawing like characters designate the same parts in the several figures.

Figure 1:
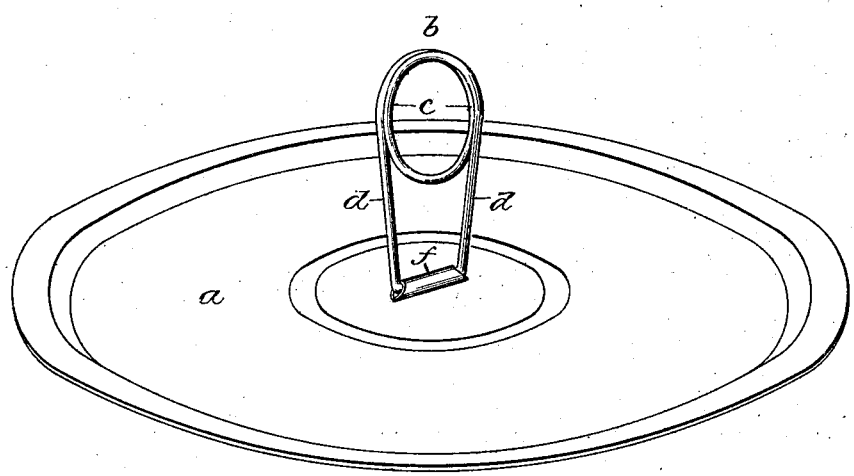
Figure 2:
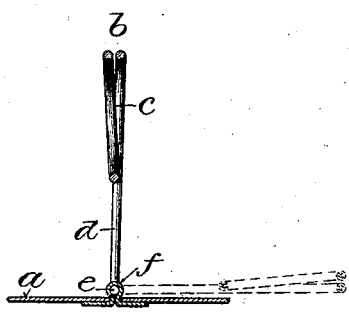
Figure 3:
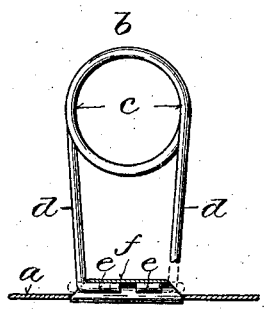

Figure 1 is a perspective view of a cover and handle embodying the invention; Fig. 2 is a central vertical section of the handle and a portion of the cover cutting the hinge or pivot bearing of the handle at right angles to its axis; and Fig. 3 is a side elevation of the handle and longitudinal section of its hinge or pivot bearing.

$a$ designates a circular cover for cooking utensils such as pots, as ordinarily made of sheet metal. It is provided with a handle $b$ which is made of spring wire preferably bent into one or more coils $c$ to render it more elastic and to form a convenient grip for grasping it with the fingers. The ends of the wire are formed into legs $d$ which are shown as tangent to opposite sides of the coils $c$ and are made of sufficient length to hold the coils forming the grip of the handle when it stands in an upright position, as shown, far enough above or away from the cover to prevent its becoming too hot to grasp and hold with the fingers. The legs, which may be made substantially straight and convergent toward their lower ends as shown, or may be otherwise shaped, terminate in inwardly bent pivot pins $e$ in line with each other.

The cover is provided with alined handle bearings consisting of a hinge loop or sleeve $f$ which may be struck up from the sheet metal of the cover, or may be made as shown, of a separate piece of sheet metal the edges of which are inserted through a slit in the cover and bent outwardly against the under side thereof, as shown in Fig. 2. The ends of this hinge loop or sleeve are inclined or beveled, as shown in Figs. 1 and 3, and engage with the legs $d$ of the handle adjacent to the pivot pins $e$.

The handle being primarily bent or formed so that the legs tend to spring toward each other and bring the ends of the pivot pins $e$ together, and the combined length of the pivot pins being somewhat less than the length of the shorter side of the hinge loop or sleeve $f$, when said pins are inserted and held in said loop or sleeve as shown, the tendency of the legs to contract will by their engagement with the beveled ends of the loop or sleeve, operate to automatically turn the handle when it is released or free, into and hold it in an upright position, in which it may be conveniently grasped to remove the cover when hot from a pot or other utensil. The handle will turn down and lie flat against the cover out of the way, as indicated by dotted lines in Figs. 2 and 3, so that a number of covers may be nested or packed closely together for storage or shipment, or a single cover will lie flat in an inverted position on a shelf or table, the legs $d$ being spread as indicated by dotted lines in Fig. 3. When however, the handle is released and left free, as when the cover is placed on a pot or other utensil, the contraction of the legs against the inclined ends of the loop or sleeve $f$ will cause it to assume an upright position, or a position substantially perpendicular to the plane of the cover.

Various modifications in details of construction may be made within the spirit and scope of the invention without affecting the mode of operation or principle of the device.

I claim:

1. A cover for cooking utensils and the like, provided with a handle bearing having a beveled end sloping toward the other end of the bearing away from the cover, the bevel extending substantially across the exposed face of the bearing, and a handle having a pivot pin fitted to turn in said bearing, and a resilient leg engaging the beveled end of the bearing with a tension toward the opposite end thereof and tending when the handle is depressed, to turn it from a recumbent position into a substantially upright position.

2. A cover for cooking utensils and the like, having a handle provided with resilient legs bent at the ends into pivot pins, and pivot bearings for the handle attached to the cover and having beveled ends engaging with the resilient legs of the handle, which when depressed, exert tension in opposite directions against the beveled ends of the bearings and tend to turn the handle from a recumbent to an upright position, the bevel of the ends extending substantially across the exposed faces of the ends of the bearings.

3. A cover for cooking utensils and the like, having a handle consisting of spring wire bent into a coil and resilient legs terminating with inwardly bent pivot pins in line with each other, and a sleeve forming pivot bearings for the handle, the ends of said sleeve engaging with the legs of the handle adjacent to its pivot pins being beveled, and the handle when depressed exerting an inward tension against the beveled ends of the sleeve to turn the handle from a recumbent into an upright position, the bevel of the ends of the sleeve extending substantially across the exposed faces of the ends of the sleeve.

In witness whereof I hereto affix my signature in presence of two witnesses.

PHILIP KEMPTER.

Witnesses:
CHAS. L. GOSS,
CHAS. A. PAESCHKE.